US012566275B2

(12) United States Patent
Goetz et al.

(10) Patent No.: US 12,566,275 B2
(45) Date of Patent: Mar. 3, 2026

(54) METHODS OF USING BACKGROUND IMAGES FROM A LIGHT DETECTION AND RANGING (LIDAR) DEVICE

(71) Applicant: Waymo LLC, Mountain View, CA (US)

(72) Inventors: Georges Goetz, Mountain View, CA (US); Luke Wachter, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 550 days.

(21) Appl. No.: 17/526,051

(22) Filed: Nov. 15, 2021

(65) Prior Publication Data

US 2022/0163675 A1 May 26, 2022

Related U.S. Application Data

(60) Provisional application No. 63/117,605, filed on Nov. 24, 2020.

(51) Int. Cl.
G01S 17/931 (2020.01)
B60W 40/02 (2006.01)
(Continued)

(52) U.S. Cl.
CPC ........... G01S 17/931 (2020.01); B60W 40/02 (2013.01); G01S 7/487 (2013.01); G01S 17/18 (2020.01);
(Continued)

(58) Field of Classification Search
CPC ......... G01S 17/89; G01S 7/414; B60W 40/02
See application file for complete search history.

(56) References Cited

U.S. PATENT DOCUMENTS 7,164,788 B1    1/2007  Nevis et al.
9,165,383 B1 *  10/2015  Mendez-Rodriguez ...................
                                                G06T 11/001
(Continued)

FOREIGN PATENT DOCUMENTS

CN        106022460 B    10/2016
CN        110568422 A    12/2019
(Continued)

OTHER PUBLICATIONS

J. Zhang, M. S. Ramanagopal, R. Vasudevan and M. Johnson-Roberson, "LiStereo: Generate Dense Depth Maps from LIDAR and Stereo Imagery," 2020 IEEE International Conference on Robotics and Automation (ICRA), Paris, France, 2020, pp. 7829-7836, doi: 10.1109/ICRA40945.2020.9196628 (Year: 2020).*
(Continued)

*Primary Examiner* — Tarifur R Chowdhury
(74) *Attorney, Agent, or Firm* — McDonnell Boehnen Hulbert & Berghoff LLP

(57) ABSTRACT

A light detection and ranging (lidar) device may be coupled to a vehicle and configured to scan a surrounding environment to determine ranges to one or more objects in the surrounding environment of the vehicle. The lidar device may generate data that can be used to form a range image, which includes or is based on range data determined for the one or more objects. The lidar device may also generate data that can be used to form a corresponding background image, which includes background light intensity data that the lidar device measures during the scan. The background image or background image data may be used to add range data to the range image, correct range data in the range image, and/or evaluate the quality of the range data in the range image. In this way, the background image or background image data can be used to generate an enhanced range image that includes range data that is more comprehensive and/or more
(Continued)

reliable than the range data included in the original range image.

18 Claims, 11 Drawing Sheets

(51) Int. Cl.

| | |
|---|---|
| *G01S 7/487* | (2006.01) |
| *G01S 17/18* | (2020.01) |
| *G01S 17/42* | (2006.01) |
| *G01S 17/89* | (2020.01) |
| *G06N 3/02* | (2006.01) |
| *G06N 3/0464* | (2023.01) |
| *G06N 3/094* | (2023.01) |
| *G06N 3/045* | (2023.01) |
| *G06N 3/047* | (2023.01) |

(52) U.S. Cl.
CPC .............. *G01S 17/42* (2013.01); *G01S 17/89* (2013.01); *G06N 3/02* (2013.01); *G06N 3/0464* (2023.01); *G06N 3/094* (2023.01); *B60W 2420/408* (2024.01); *B60W 2554/4049* (2020.02); *G06N 3/045* (2023.01); *G06N 3/047* (2023.01)

(56) References Cited

U.S. PATENT DOCUMENTS

| | | | |
|---|---|---|---|
| 10,317,529 B2 | 6/2019 | Shu et al. | |
| 10,641,897 B1 | 5/2020 | Dussan et al. | |
| 10,647,449 B2 | 5/2020 | Wasson et al. | |
| 2007/0215789 A1 | 9/2007 | Wiklof et al. | |
| 2012/0106799 A1 | 5/2012 | Shi et al. | |
| 2019/0146071 A1 | 5/2019 | Donovan | |
| 2019/0318177 A1* | 10/2019 | Steinberg .............. | G01S 7/4817 |
| 2019/0353786 A1 | 11/2019 | Wei | |
| 2020/0111358 A1 | 4/2020 | Parchami et al. | |
| 2020/0137373 A1 | 4/2020 | Iguchi | |
| 2020/0150236 A1 | 5/2020 | Hayashi et al. | |
| 2020/0183013 A1 | 6/2020 | Iguchi et al. | |
| 2020/0189467 A1 | 6/2020 | Kondo et al. | |
| 2020/0200872 A1 | 6/2020 | Böckem et al. | |
| 2020/0284887 A1 | 9/2020 | Wachter et al. | |
| 2020/0333462 A1 | 10/2020 | Mellor et al. | |
| 2021/0150799 A1* | 5/2021 | Yang ................. | B60W 30/0956 |
| 2022/0011440 A1* | 1/2022 | Kato .................... | H01L 31/167 |
| 2022/0091266 A1* | 3/2022 | Sivakumar .............. | G01S 17/89 |

FOREIGN PATENT DOCUMENTS

| | | |
|---|---|---|
| CN | 111754583 A | 10/2020 |
| DE | 102020003009 A1 | 7/2020 |
| EP | 3705913 A1 | 9/2020 |
| JP | 2018091760 A | 6/2018 |
| JP | 2019074419 A | 5/2019 |
| JP | 2019-105550 A | 6/2019 |
| JP | 2019219248 A | 12/2019 |
| WO | 2004042662 A1 | 5/2004 |
| WO | 2017154456 A1 | 9/2017 |
| WO | 2019012087 A1 | 1/2019 |
| WO | 2019163673 A1 | 8/2019 |
| WO | 2020158401 A1 | 8/2020 |
| WO | 2020162273 A1 | 8/2020 |
| WO | 2020196513 A1 | 10/2020 |

OTHER PUBLICATIONS

F. Ma and S. Karaman, "Sparse-to-Dense: Depth Prediction from Sparse Depth Samples and a Single Image," 2018 IEEE International Conference on Robotics and Automation (ICRA), Brisbane, QLD, Australia, 2018, pp. 4796-4803, doi: 10.1109/ICRA.2018. 8460184 (Year: 2018).*

International Search Report and Written Opinion for International Application No. PCT/US2021/059677 dated Mar. 10, 2022; 8 Pages.

"Background Light Rejection in SPAD-Based LiDAR Sensors by Adaptive Photon Coincidence Detection"; Maik Beer, et al.; Sensors 2018, 18, 4338 (Dec. 8, 2018).

"Performance Analysis of Ghost Imaging Lidar in Background Light Environment"; Chenjin Deng, et al.; Photonics Research, vol. 5, Issue 5, pp. 431-435 (Aug. 21, 2017).

* cited by examiner

1000

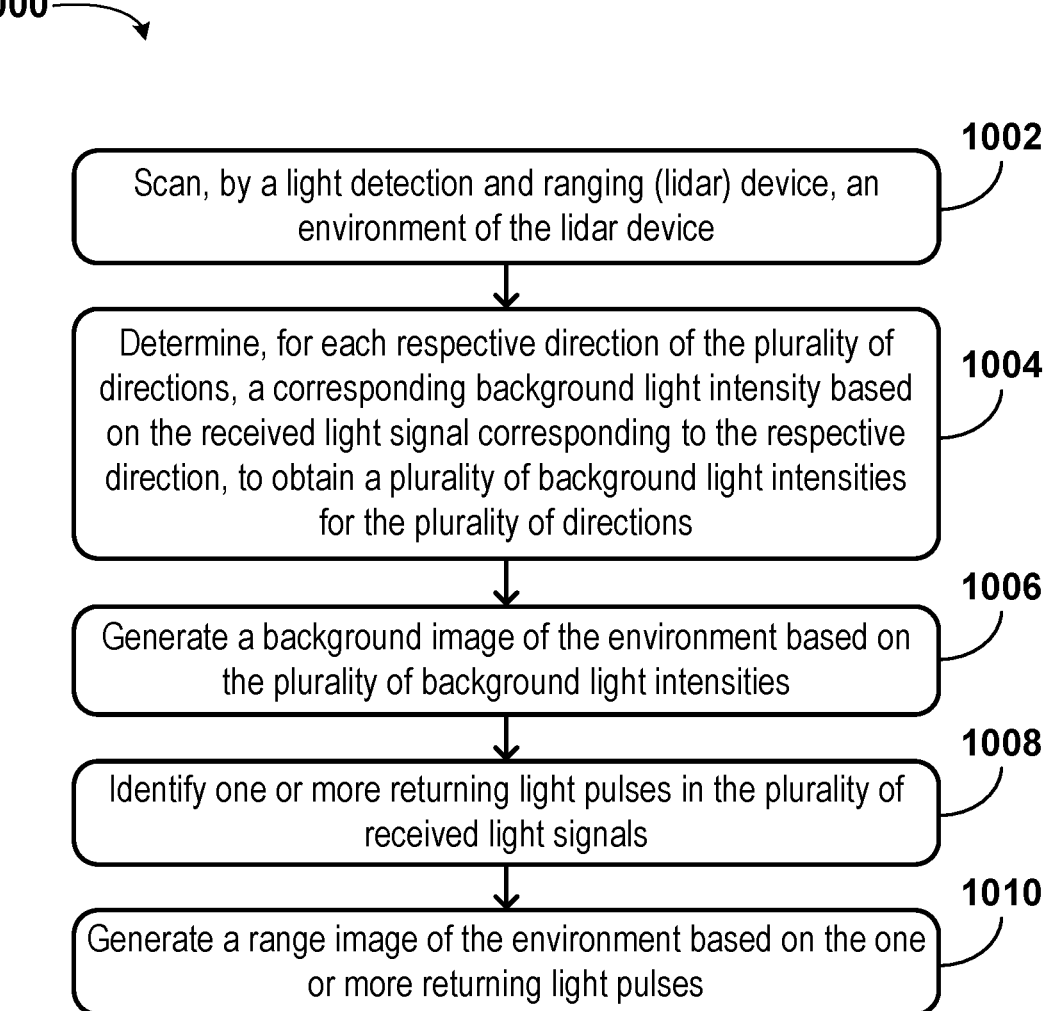

1002

Scan, by a light detection and ranging (lidar) device, an environment of the lidar device

1004

Determine, for each respective direction of the plurality of directions, a corresponding background light intensity based on the received light signal corresponding to the respective direction, to obtain a plurality of background light intensities for the plurality of directions

1006

Generate a background image of the environment based on the plurality of background light intensities

1008

Identify one or more returning light pulses in the plurality of received light signals

1010

Generate a range image of the environment based on the one or more returning light pulses

FIG. 10

METHODS OF USING BACKGROUND IMAGES FROM A LIGHT DETECTION AND RANGING (LIDAR) DEVICE

CROSS-REFERENCE TO RELATED APPLICATIONS

The present application is a non-provisional application claiming priority to provisional U.S. Application No. 63/117,605, filed Nov. 24, 2020, the contents of which are hereby incorporated by reference in their entirety.

BACKGROUND

Unless otherwise indicated herein, the materials described in this section are not prior art to the claims in this application and are not admitted to be prior art by inclusion in this section.

A light detection and ranging (lidar) device may be used to determine a range and direction to an object in its environment by emitting a light pulse in a particular direction toward the object and detecting a returning light pulse that corresponds to a portion of the emitted light pulse that is reflected by the object. The range may be calculated based on a time difference between when the light pulse is emitted and when the returning light pulse is detected.

However, a lidar device may have a maximum range beyond which the lidar device may be unable to determine distances to objects. In addition, adverse weather conditions, such as snow, rain, and fog can further limit the maximum effective range of a lidar device and can cause artifacts in the range data. Artifacts can also be caused by retroreflectors or other highly reflective objects in the environment of the lidar device and by contaminants (rain, dirt, etc.) such as on the aperture of the lidar device.

Thus, there is a need to provide methods and systems for improving range data obtained by a lidar device.

SUMMARY

In one aspect, a method is provided. The method involves scanning, by a light detection and ranging (lidar) device, an environment surrounding the lidar device. The lidar device includes one or more light emitters and one or more light detectors. The scanning includes (i) using the one or more light emitters to emit a plurality of emitted light pulses in a plurality of directions and (ii) using the one or more light detectors to detect, for each direction of the plurality of directions, a corresponding received light signal, to obtain a plurality of received light signals for the plurality of directions. The method further involves determining, for each respective direction of the plurality of directions, a corresponding background light intensity based on the received light signal corresponding to the respective direction, to obtain a plurality of background light intensities for the plurality of directions. In addition, the method includes generating a background image of the environment surrounding the lidar device based on the plurality of background light intensities. Further, the method includes identifying one or more returning light pulses in the plurality of received light signals. Each returning light pulse is indicative of reflection of an emitted light pulse by an object in the environment surrounding the lidar device. Additionally, the method includes generating a range image of the environment surrounding the lidar device based on the one or more returning light pulses. The range image includes range data indicative of ranges of one or more objects in the environment surrounding the lidar device.

In another aspect, a system is provided. The system includes a light detection and ranging (lidar) device and an image processor coupled to the lidar device. The lidar device includes one or more light emitters. The lidar device is configured to scan an environment surrounding the lidar device using the one or more light emitters to emit a plurality of emitted light pulses in a plurality of directions and using the one or more light detectors to detect, for each direction of the plurality of directions, a corresponding received light signal, to obtain a plurality of received light signals for the plurality of directions. The lidar device is also configured to determine, for each respective direction of the plurality of directions, a corresponding background light intensity based on the received light signal corresponding to the respective direction, to obtain a plurality of background light intensities for the plurality of directions. Additionally, the lidar device is configured to generate a background image of the environment surrounding the lidar device based on the plurality of background light intensities. Further, the lidar device is configured to identify one or more returning light pulses in the plurality of received light signals. Each returning light pulse is indicative of reflection of an emitted light pulse by an object in the environment surrounding the lidar device. In addition, the lidar device is configured to generate a range image of the environment surrounding the lidar device based on the one or more returning light pulses. The range image includes range data indicative of ranges of one or more objects in the environment surrounding the lidar device. The image processor is configured to receive the background image and the range image from the lidar device. The image processor is also configured to generate an enhanced range image based on the background image and the range image. The enhanced range image includes additional range data that was not included in the range image.

In yet another aspect, a digital image is provided. The digital image includes range data determined based on detection by a light detection and ranging (lidar) device of light having wavelengths of approximately a specific wavelength. The light is from one or more objects in an environment surrounding the lidar device reflecting one or more laser light pulses emitted by the lidar device in a plurality of different directions. The digital image also includes background image data determined based on detection by the lidar device of a respective background light intensity for each of the plurality of different directions.

In still another aspect, a method is provided. The method includes obtaining range data that is determined based on detection by a light detection and ranging (lidar) device of light having wavelengths of approximately a specific wavelength. The light is from one or more objects in an environment surrounding the lidar device reflecting one or more laser light pulses emitted by the lidar device in a plurality of different directions. The method also includes obtaining background image data that is determined based on detection by the lidar device of a respective background light intensity for each of the plurality of different directions. Additionally, the method includes generating a digital image based on the range data and the background image data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 10 is an illustration of a method, according to an example embodiment.

DETAILED DESCRIPTION

Figure 1:
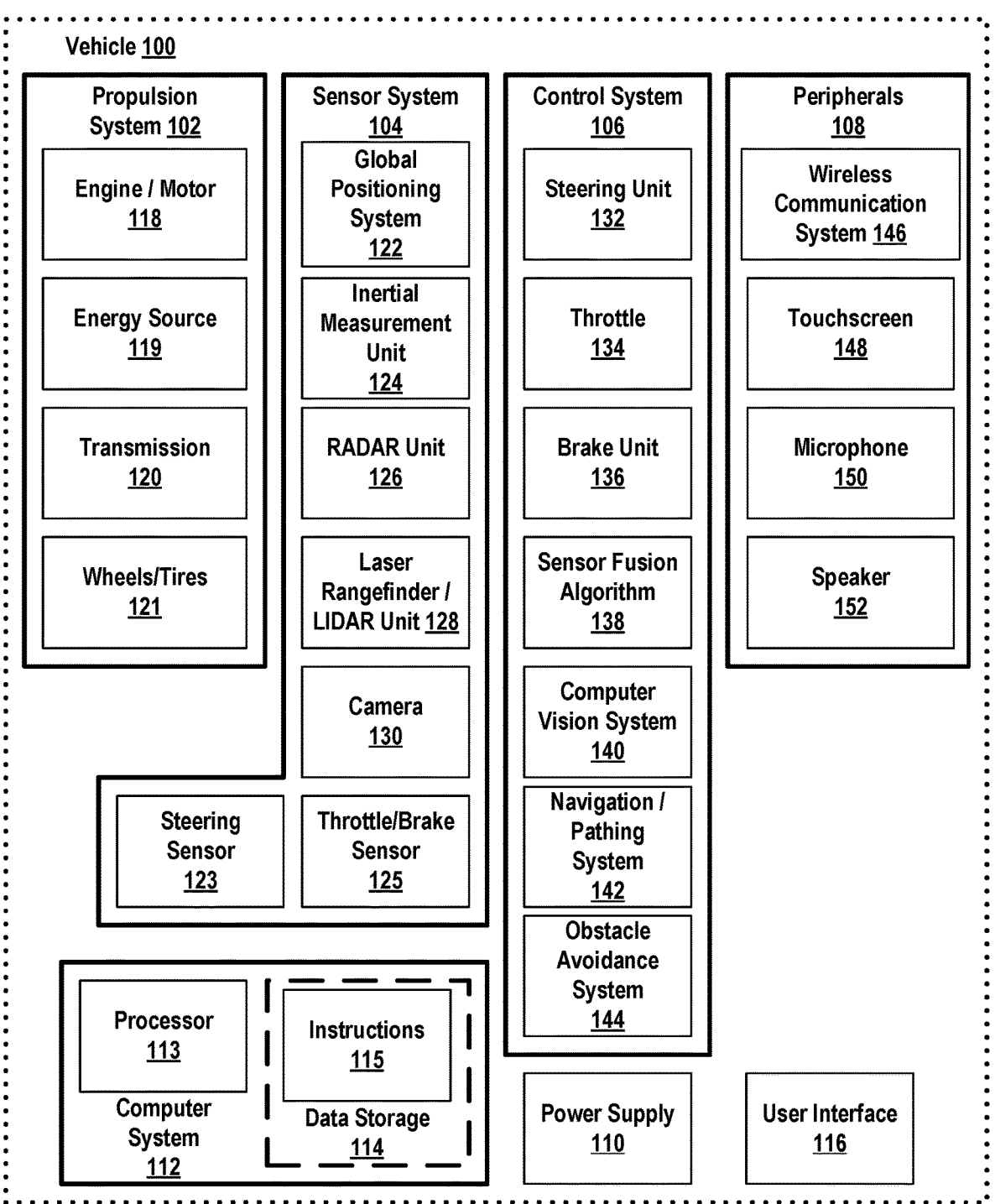
FIG. 1 is a functional block diagram illustrating a vehicle, according to example embodiments.
Figure 2A:
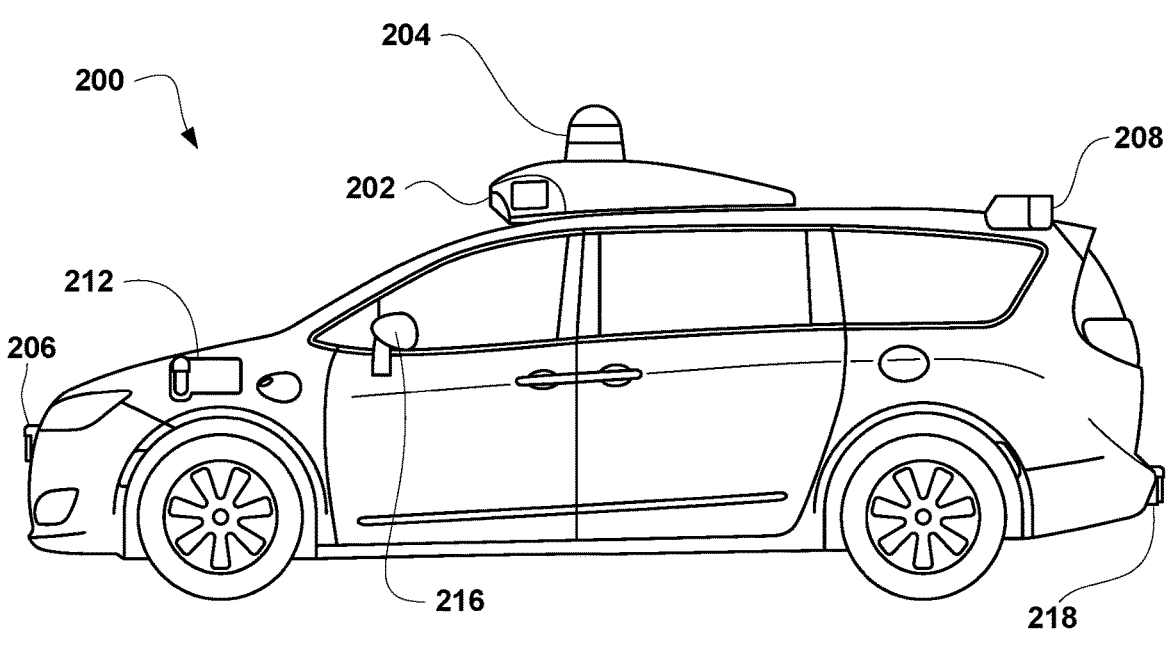
FIG. 2A is an illustration of a physical configuration of a vehicle, according to example embodiments.
Figure 2B:
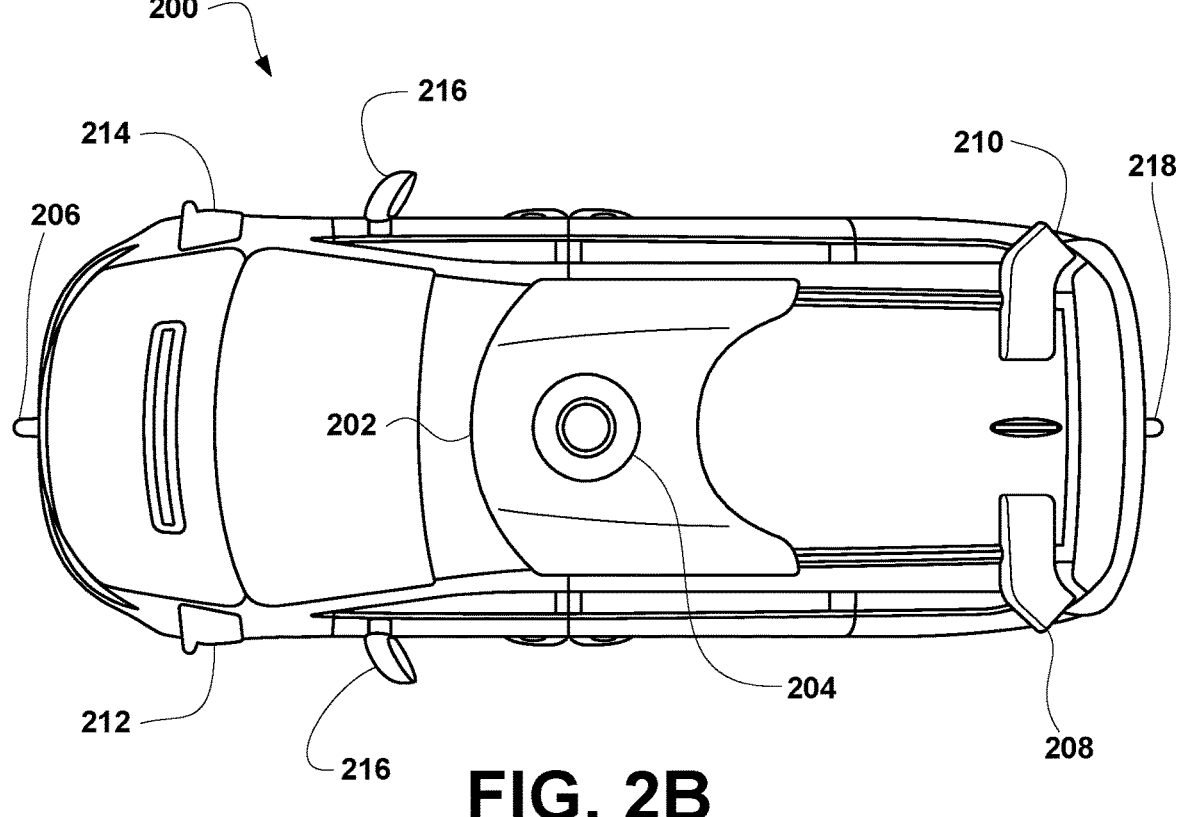
FIG. 2B is an illustration of a physical configuration of a vehicle, according to example embodiments.
Figure 2C:
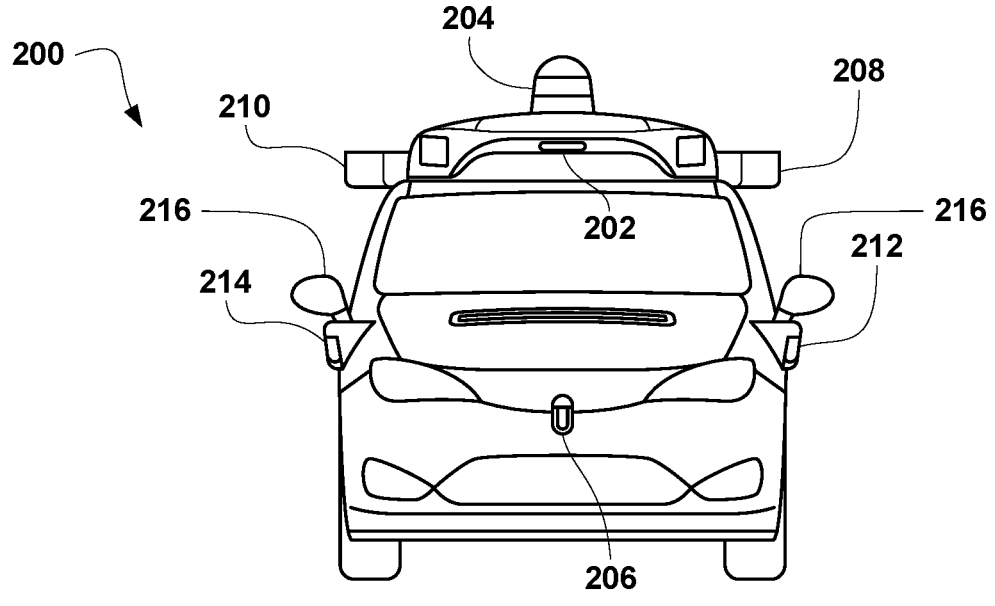
FIG. 2C is an illustration of a physical configuration of a vehicle, according to example embodiments.
Figure 2D:
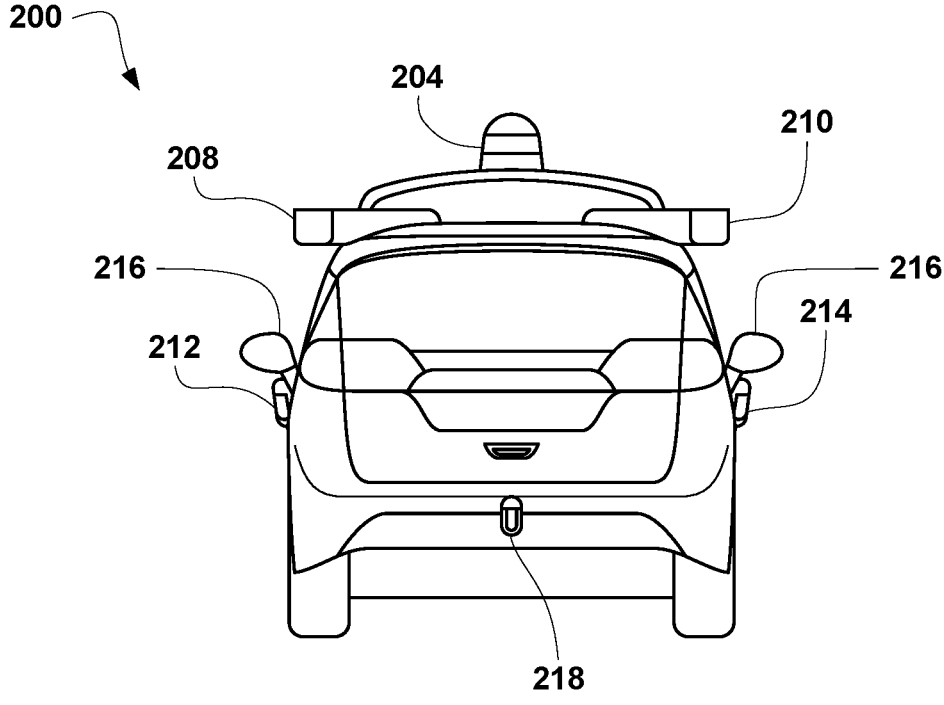
FIG. 2D is an illustration of a physical configuration of a vehicle, according to example embodiments.
Figure 2E:
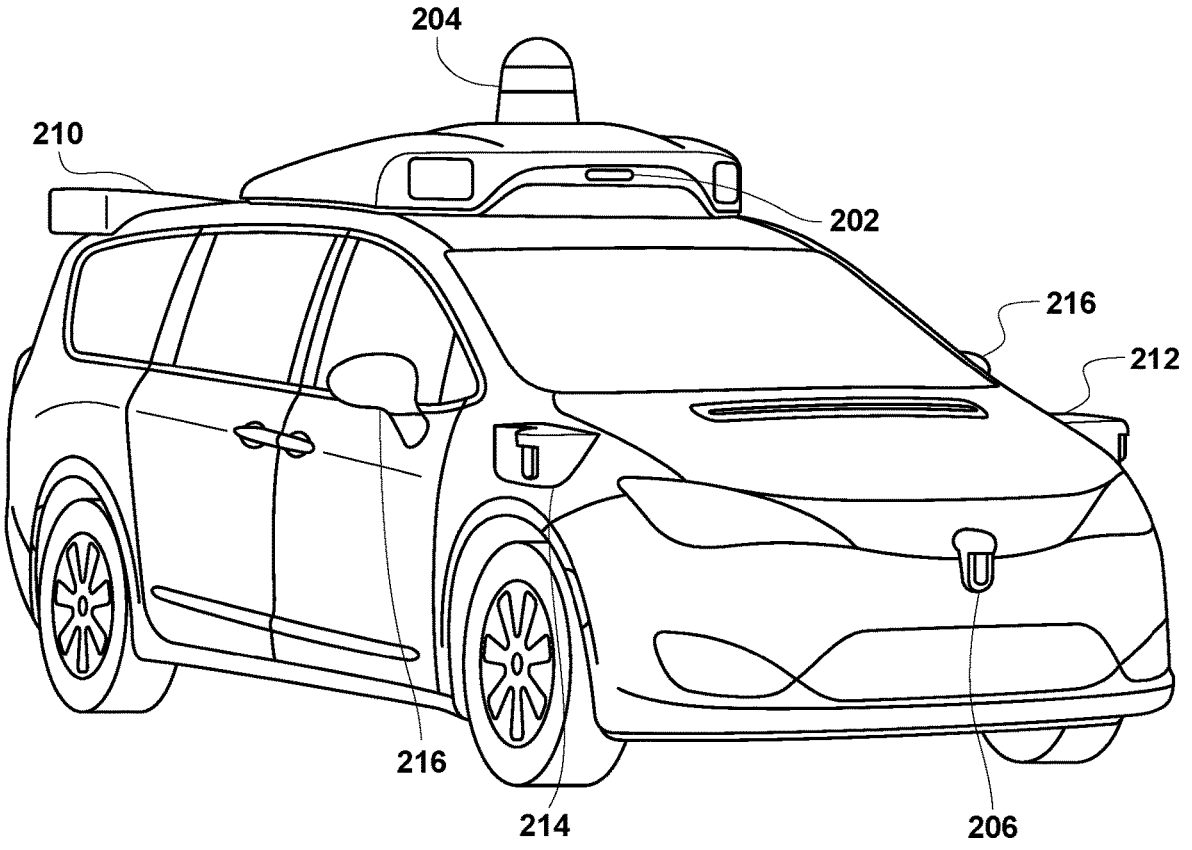
FIG. 2E is an illustration of a physical configuration of a vehicle, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as inside a building or outside of the building. Additionally or alternatively, the surrounding environment could include an interior environment of a vehicle. Additionally or alternatively, the surrounding environment could include a vicinity around and/or on a roadway. Examples of objects in the surrounding environment include, but are not limited to, other vehicles, traffic signs, pedestrians, roadway surfaces, buildings, terrain, etc. Additionally, the one or more light emitters could emit light into a local environment of the lidar system itself. For example, emitted light from the one or more light emitters could interact with a housing of the lidar system and/or surfaces or structures coupled to the lidar system. In some cases, the lidar system could be mounted to a vehicle. In such scenarios, the one or more light emitters can be configured to emit light that interacts with objects within a vicinity of the vehicle. The light emitters may include optical fiber amplifiers, laser diodes, light-emitting diodes (LEDs), etc.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the laser rangefinder/lidar 128 may include one or more photodetectors. Such photodetectors may be especially sensitive detectors. In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or laser rangefinder/lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors 216 for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more range finders, one or more inertial sensors, one or more humidity sensors, one or more acoustic sensors (e.g., microphones, sonar devices, etc.), or one or more other sensors configured to sense information about an environment surrounding the vehicle 200. In other words, any sensor system described elsewhere herein could be coupled to the vehicle 200 and/or could be utilized in conjunction with various operations of the vehicle 200. As an example, a lidar system could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars, one or more lidars and cameras, one or more cameras and radars, etc.).

In some examples, the sensor systems could be disposed in various other locations on the vehicle 200 (e.g., at location 216, etc.) and could have fields of view that correspond to internal and/or surrounding environments of the vehicle 200. While the one or more sensor systems 202, 204, 206, 208, 210, 212, 214, and/or 218 are illustrated on certain locations on vehicle 200, it will be understood that more or fewer sensor systems could be utilized with vehicle 200. Further, the locations of such sensor systems could be adjusted, modified, or otherwise changed as compared to the locations of the sensor systems illustrated in FIGS. 2A-2E.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.).

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, range finders, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

In an example configuration, one or more radars can be located on vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
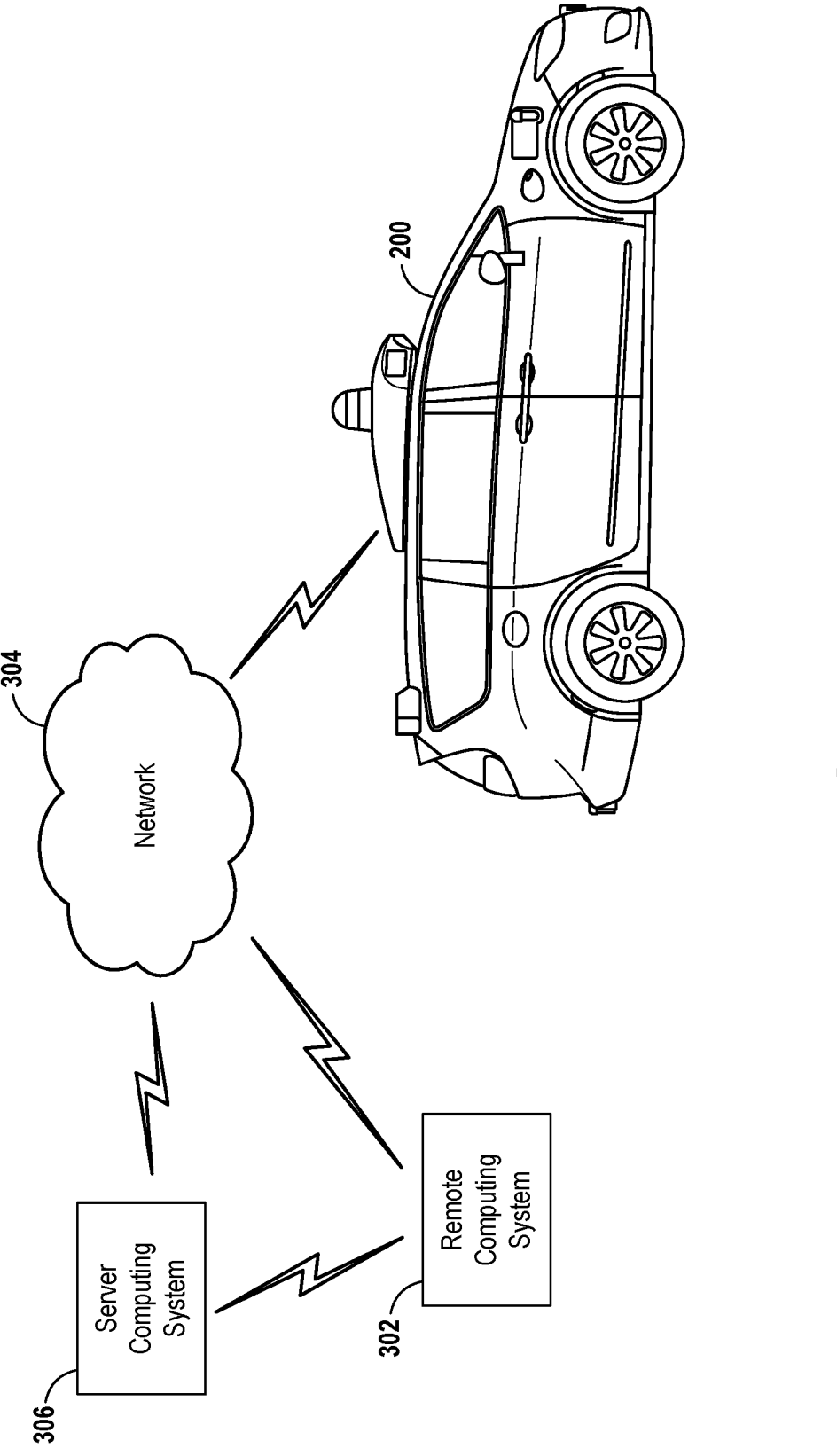
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

A lidar device (e.g., the first lidar unit 204 or the second lidar unit 206 shown and described with reference to FIGS. 2A-2E) may be used to determine a distance or range to an object by emitting a light pulse from a light emitter and detecting, by a light detector, a returning light pulse that corresponds to a portion of the emitted light pulse that has been reflected by an object in the surrounding environment of the lidar device. The range, R, to the object can be calculated as follows:

$$R = (c\Delta t)/2 \tag{1}$$

where $\Delta t$ is the time difference between when the light pulse is emitted and when the returning light pulse is detected, and c is the speed of light.

To detect a returning light pulse, the light detector may detect a received light signal during a detection period. The received light signal can include a component that results from light that originated from the light emitter (i.e., a returning light pulse). The received light signal may also include a component that results from light that originated from other light sources (e.g., light from the sun or other ambient light sources). Such light from other light sources can be regarded as noise that limits that light detector's ability to detect a returning light pulse. For example, a returning light pulse could be sufficiently weak that it cannot be reliably detected over the noise.

To reduce the noise, the light detector can be arranged to receive light through a wavelength-selective filter. The filter may pass a narrow range of wavelengths that includes the wavelength of the light emitted by the light emitter. For example, the light emitter may emit light with a wavelength of about 905 nm or 1550 nm, and the filter may have a 20 nm passband centered at about 905 nm or 1550 nm. In other words, the filter may pass light having wavelengths of approximately a specific wavelength (e.g., approximately a wavelength of 905 nm or approximately a wavelength of 1550 nm). It is also understood that other passband widths and center wavelengths are possible and are contemplated herein. For example, a 5 nm passband, a 10 nm passband, a 15 nm passband, a 25 nm passband, a 30 nm passband, a 35 nm passband, a 40 nm passband, etc. are also possible. Further, additional or alternative techniques may be used to limit analyzed light to only wavelengths of approximately a specific wavelength. For example, a detector may detect a broad spectrum of light, but a digital filter may be applied to the detection data (e.g., a captured image, point, or point-cloud) to eliminate detected light that is outside a specified range of wavelengths (e.g., to eliminate detected light that is not of approximately a specific wavelength).

Even with such filtering, the light detector may detect a significant amount of light from ambient light sources (particularly the sun), which results in noise in the received light signal. To address the presence of noise, a portion of the received light signal can be analyzed to determine a background light intensity. A returning light pulse can then be detected in the received light signal as a peak that exceeds the background light intensity. This approach is illustrated in FIG. 4A.

Figures 4A, 4B:
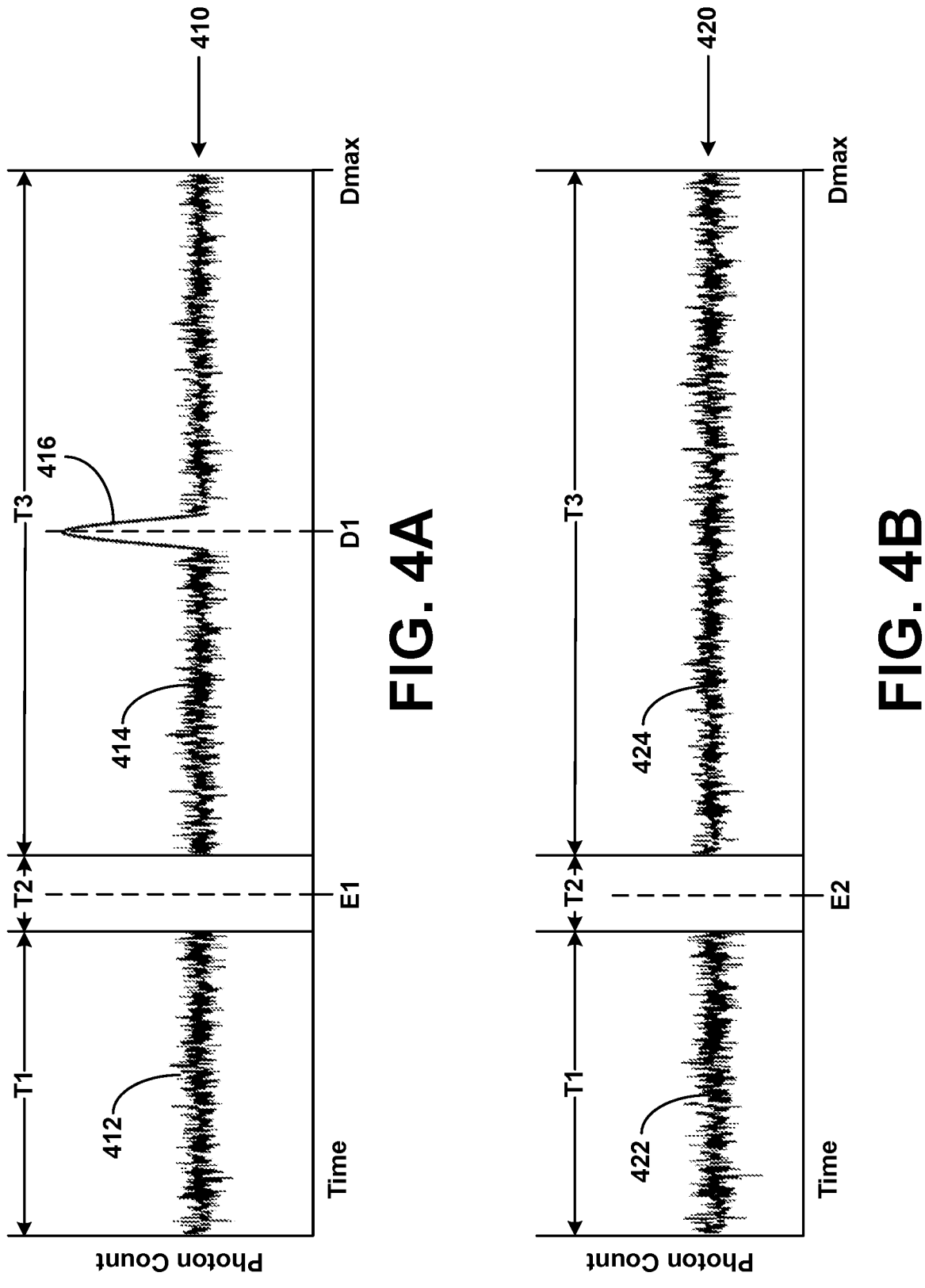
FIG. 4A illustrates a received light signal that is detected by a light detector of a lidar device during a detection period, in which the received light signal includes a returning light pulse, according to an example embodiment.
FIG. 4B illustrates a received light signal that is detected by a light detector of a lidar device during a detection period, in which the received light signal does not include a returning light pulse, according to an example embodiment.

FIG. 4A shows an example received light signal 410 that is detected by a light detector during a detection period. In this example, the light detector is a single photon detector, such as an array of SPADs, so the received light signal corresponds to a photon count as a function of time. It is to be understood, however, that a lidar device may include other types of light detectors, such as avalanche photodiodes (APDs) operating in an analog mode.

As shown in FIG. 4A, the detection period includes three, sequential time periods, labeled as T1, T2, and T3. A light pulse is emitted from a light emitter during the time period T2, at an emission time E1. The time period T1 occurs before the time period T2 and includes a first segment 412 of the received light signal 410. The time period T3 occurs after the time period T2 and includes a second segment 414 of the received light signal. In this example, the light detector is deactivated or unused during the time period T2 (e.g., to prevent the light detector from being swamped by internal reflections of the emitted light pulse), so there is no received light signal in the time period T2.

Because the time period T1 occurs before the light pulse is emitted, the first segment 412 is only noise resulting from ambient light sources. Thus, the first segment 412 can be used to determine a background light intensity, for example, as an average photon count during the time period T1. The background light intensity could also be determined in other ways, such as from the received light signal in time period T3 (e.g., based on a standard deviation of the received light signal in time period T3).

The time period T3 occurs after the light pulse is emitted, so the second segment 414 may include a reflected light pulse. To detect a reflected light pulse, the second segment 414 may be compared to the background light intensity determined from the first segment 412. If a portion of the second segment 414 exceeds the background light intensity by at least a threshold amount, then that portion of the second segment 414 may be regarded as a returning light pulse resulting from an object in the surrounding environment reflecting the emitted light pulse. In the example shown in FIG. 4A, the second segment 414 includes a returning light pulse 416.

A returning light pulse that is detected in the received light signal can be associated with a detection time, for example, the time at which the returning light pulse is at its peak value. As shown in FIG. 4A, the returning light pulse 416 has a detection time D1 corresponding to the peak of the returning light pulse 416. A range to the object that caused the returning light pulse can be calculated based on the time difference between the emission time, E1, and the detection time, D1. A reflectivity of the object and/or other information regarding the object could also be determined based on other aspects of the received light pulse, such as the height of the pulse, the width of the pulse, or the shape of the pulse.

In many cases, however, the received light signal that is detected by the light detector will not include a reflected light pulse. For example, FIG. 4B illustrates a received light signal 420 that includes a segment 422 in time period T1 and a segment 424 in time period T3. The background light intensity can be determined using segment 422, as described above. And a light pulse is emitted during the time period T2, at an emission time E2. In this case, however, no returning light pulse is detected in segment 424.

The lack of a returning light pulse may indicate that there is no object within the maximum range of the lidar device. However, it is also possible that an object that is within the maximum range results in a returning light pulse that is too weak to be detected. This can occur because the object has a low reflectivity, because snow, rain, fog, or other weather conditions have obscured the emitted and/or returning light pulse, or because water, dirt, or other contaminants on the aperture of the lidar device have obscured the emitted and/or returning light pulse.

The length of time period T3 may be set based on the maximum range of the lidar device. In particular, the latest possible detection time for a returning light pulse may correspond to the end of the time period T3, which is labeled as Dmax in FIGS. 4A and 4B. The maximum range that can be determined is based on the time difference between Dmax and the emission time (E1 in FIG. 4A, E2 in FIG. 4B). An object that is farther away than this maximum range may still reflect the emitted light pulse, but the returning light pulse may not be detected because it is received after the end of the light detector's detection period. However, it is also possible that the returning light pulse may be detected in a subsequent detection period. For example, an emitted light pulse that is reflected by a highly reflective object (e.g., a retroreflector) that is farther away than the lidar device's maximum range may result in a returning light pulse that is detected in a detection period that is later than the detection period in which the emitted light pulse is emitted. This can lead to ambiguity in determining ranges to retroreflectors or other highly reflective objects.

In the examples shown in FIGS. 4A and 4B, the light emitter of the lidar device emits a light pulse in a particular direction, and the light detector of the lidar device is able to detect light within a field of view that corresponds to that direction. In practice, a lidar device may scan a portion of the surrounding environment by using a light emitter to emit light pulses in a plurality of different directions and, for each direction, using a light detector to detect light within a corresponding field of view. The different directions may result from a rotation or other movement or other steering of the lidar device. For example, a lidar device may rotate about an axis (e.g., a vertical axis) while emitting light pulses, so as to scan through a 360-degree portion of the surrounding environment. Alternatively or additionally, one or more optical components within the lidar device may change the directions in which light pulses are emitted and returning light pulses are received. For example, a lidar device may include a rotating mirror that deflects emitted light pulses in different directions. Other examples of beam steering are also possible, including non-mechanical techniques.

In some implementations, a lidar device may include a plurality of light emitters and a plurality of light detectors. In such implementations, scanning the surrounding environment may involve different light emitters emitting light pulses in different directions at the same or about the same time and the light detectors detecting light in corresponding fields of view, in addition to rotation or other motion of the lidar device and/or adjustment of directions by one or more optical components within the lidar device.

Based on a scan of the surrounding environment, the lidar device may generate a range image based on the ranges that are determined from returning light pulses that are detected during the scan. The range image may correspond to a portion of the surrounding environment based on the different directions in which light pulses are emitted during the scan. In some examples, each direction may include a respective pitch angle (e.g., an angle with respect to a horizontal angle) and a respective yaw angle (e.g., an angle in the horizontal plane), such that the range image includes a plurality of pitch angles and a plurality of yaw angles. The lidar device may also generate a background image based on the background light intensities that are determined for each direction in the scan (e.g., as described above for FIGS. 4A and 4B). Thus, the background image may include the same pitch angles and yaw angles as the range image.

Figure 5:
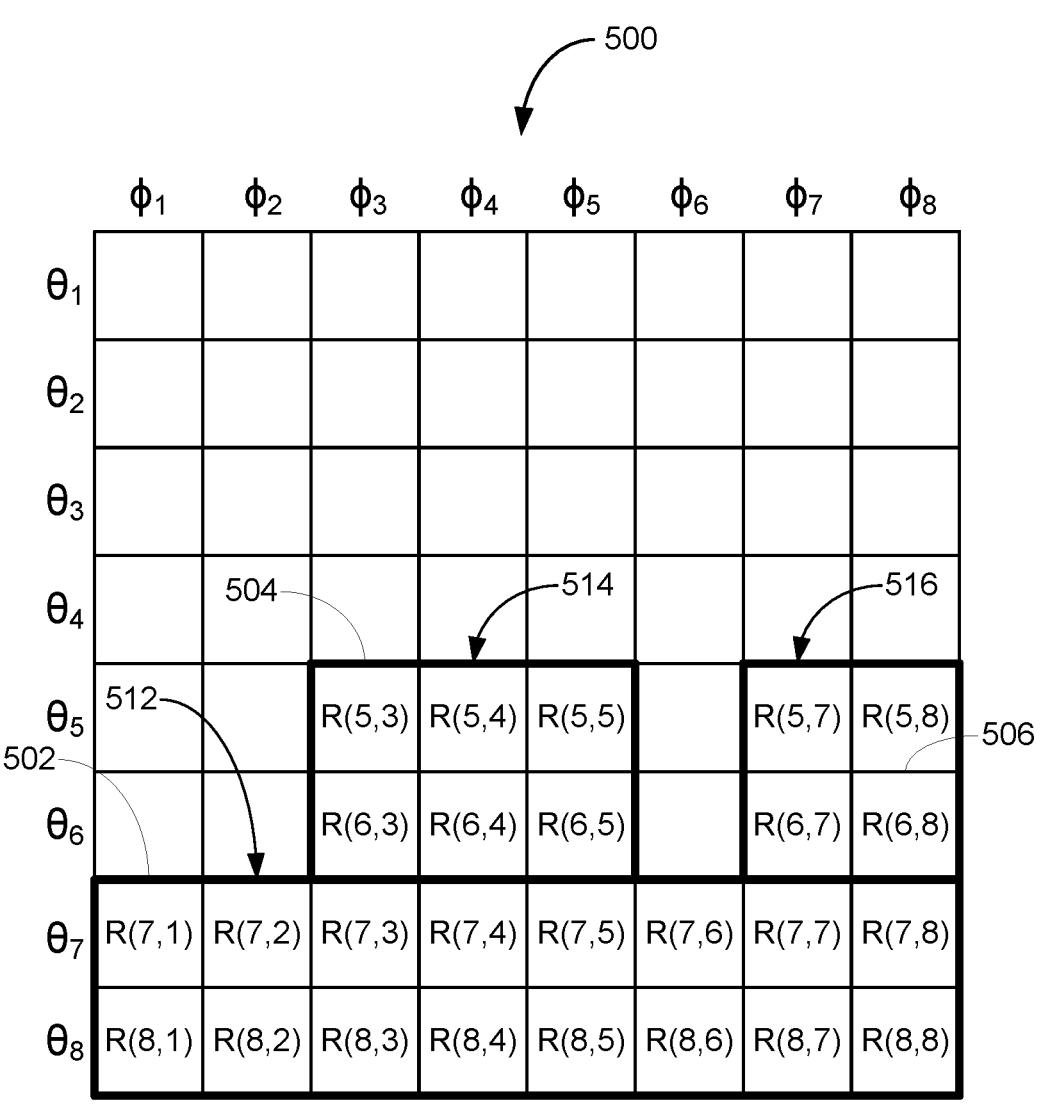
FIG. 5 illustrates a range image, according to an example embodiment.
Figure 6:
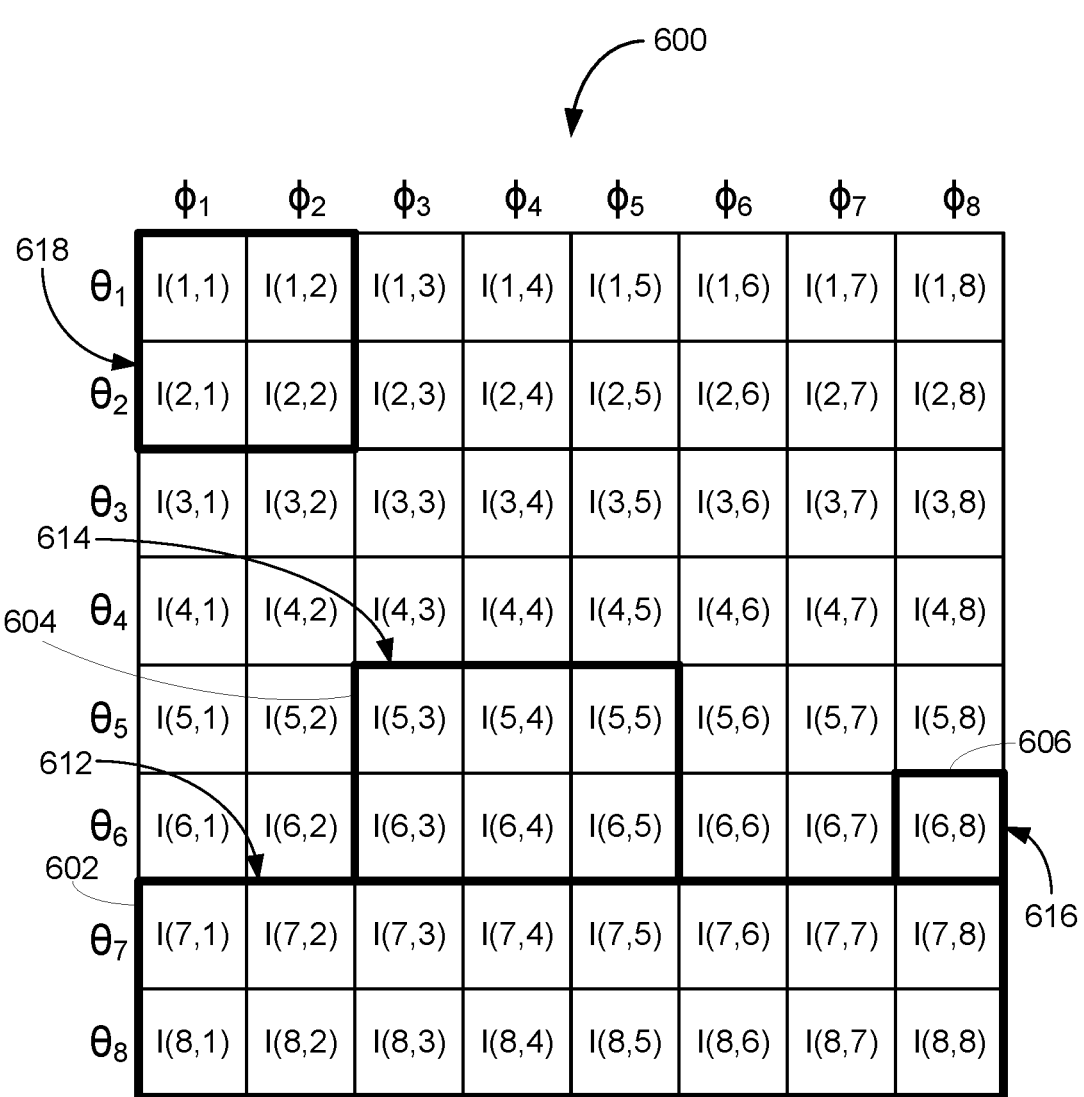
FIG. 6 illustrates a background image, according to an example embodiment.

FIG. 5 illustrates an example range image 500 that includes eight pitch angles ($\theta_1$ through $\theta_8$) and eight yaw angles ($\phi_1$ through $\phi_8$), and FIG. 6 illustrates a corresponding background image 600 that includes the same pitch angles and yaw angles. It is to be understood that these are merely examples, as a range image or background image could include a greater or fewer number of pitch angles or yaw angles.

Each square within the range image 500 represents a "pixel" that can include a range to an object (and possibly other data regarding the object, such as reflectivity) that was determined based on a light pulse that was emitted in the direction indicated by the corresponding pitch angle and yaw angle and that resulted in a returning light pulse being detected. For example, pixel 502 includes a range, R(7,1), that was determined based on a light pulse emitted in a direction with pitch angle $\theta_7$ and yaw angle $\phi_1$, pixel 504 includes a range, R(5,3), that was determined based on a light pulse emitted in a direction with pitch angle $\theta_5$ and yaw angle $\phi_3$, and pixel 506 includes a range, R(6,8), that was determined based on a light pulse that was emitted in a direction with pitch angle $\theta_6$ and yaw angle $\phi_8$. In this example, many of the pixels in the range image 500 are blank, indicating that no returning light pulse was detected and, thus, no range was determined for those directions.

For purposes of illustration, range image 500 will be further described for an example in which the lidar device is coupled to a vehicle and is used to obtain range data regarding the environment in front of the vehicle. In this example, range image 500 includes range data for the road surface on which the vehicle is traveling (indicated by bounding box 512), range data for another vehicle (indicated by bounding box 514), and range data for a sign (indicated by bounding box 516). Thus, pixel 502 is one of sixteen pixels that include ranges to the road surface, pixel 504 is one of six pixels that include ranges to the other vehicle, and pixel 506 is one of four pixels that include ranges to the sign.

With the other vehicle being represented by only six pixels, range image 500 may be regarded as "sparse." In practice, a range image for this surrounding environment could have a much higher resolution and could include a much larger number of pixels for the other vehicle and for the other objects detected in the scene.

FIG. 6 illustrates the corresponding background image 600. As shown, each pixel in background image 600 includes a background light intensity that was determined by the lidar device for a particular pitch angle and yaw angle. For example, pixel 602 includes a background light intensity, I(7,1), that was determined for pitch angle $\theta_7$ and yaw angle $\phi_1$, pixel 604 includes a background light intensity, I(5,3), that was determined for pitch angle $\theta_5$ and yaw angle $\phi_3$, and pixel 606 includes a background light intensity, I(6,8), that was determined for pitch angle $\theta_6$ and yaw angle $\phi_8$. Unlike the range image 500 in which some pixels are blank because no returning light pulse was detected, a background light intensity could be determined for each direction regardless of whether a returning light pulse is detected.

The background light intensities included in the background image 600 could be determined, for example, as described above for FIGS. 4A and 4B. Thus, each background light intensity could be based on a portion of the received light signal occurring before the light pulse is emitted (the received light signal during time period T1). Alternatively, another portion of the received light signal could be used to determine the background light intensities. For example, a portion of the received light signal occurring after the light pulse is emitted (the received light signal during time period T3 or during a portion of this period) could be used to determine a background light intensity.

As noted above, the background light that is measured is from ambient light sources, particularly the sun. Thus, the background image 600 will generally have higher background light intensities during the day than at night, and will generally have higher background light intensities during clear days than during cloudy days. Within the background image 600, pixels with high background light intensities may correspond to ambient light sources (sun, sky, etc.) and objects that reflect the detected wavelengths (e.g., near infrared wavelengths) with high efficiency, whereas pixels with low background light intensities may correspond to less reflective objects. In this way, the background image 600 can depict or can be used to depict objects in the scene, much like a conventional camera image.

Each pixel in background image 600 can be correlated with a respective pixel in the range image 500 as having the same pitch angle and yaw angle. Thus, pixels 602, 604, and 606 in background image 600 can be correlated with pixels 502, 504, and 506, respectively, in range image 500. The objects identified in the range image 500 may also be identified in the background image 600. In particular, the road surface is indicated by a bounding box 612, the other vehicle is indicated by a bounding box 614, and the sign is indicated by a bounding box 616.

However, the background image 600 can show objects in the scene differently than in the range image 500. For example, the bounding box 616 for the sign is smaller in the background image 600 than the bounding box 516 for the sign in the range image 500. As discussed below, the difference may result from some of the range data for the sign being spurious (e.g., resulting from cross-talk). In addition, the background image 600 shows another object, a building indicated by bounding box 618. The building is not shown in the range image 500 because it is farther away than the maximum range of the lidar device.

As the examples shown in FIGS. 3 and 4 illustrate, the background image can include information regarding objects in the surrounding environment that is different than the range data that is included in the corresponding range image. Moreover, the information from the background image can be used to supplement, correct, or annotate the range data included in the range image.

In some embodiments, the background image may be used to determine additional range data, such as ranges to objects that are farther away than the lidar device's maximum range. Different techniques may be used to determine range data using the background image. In one approach, an object may be identified in the background image and a range to the object may be estimated based on the size of the object of the background image. For example, an object that has a known or typical physical size (e.g., a sign, a vehicle, or a pedestrian) may be identified in the background image, and the physical size of the object may be compared to the size of the object in the background image to estimate a range to the object. In some cases, information regarding the vehicle's location may be used, along with map data, to identify objects and determine their physical sizes. For example, to identify the building in bounding box 618 and determine its size, the vehicle's location may be used to identify the building in the background image 600 as corresponding to a building described in map data (and the map data may include data indicative of the size of the building).

In another approach, estimated ranges to objects shown in the background image may be determined using a trained machine learning system, such as a trained neural network. As one example, a generative adversarial network (GAN) may be used. GANs have been used to perform image-to-image translation in which the GAN takes an image as input and maps it to a generated output image with different properties. In this application, the background image could be provided as an input to a GAN that is trained to provide a translated background image that includes range data for the objects shown in the background image. This can be posed as a colorization problem that associates ranges with colors.

In some implementations, the background image and the range image can both be provided as inputs to the GAN, and the output generated by the GAN may be an enhanced range image that includes the best range data that can be determined from the input images. In many cases, ranges for shorter distances (e.g., distances within the lidar device's maximum range) may correspond to ranges included in the range image, whereas ranges for longer distances may be ranges that are estimated from the background image. The background image may also be used to resolve ambiguities in the range data included in the range image. As noted above, the ranges determined for retroreflectors can be associated with ambiguity because of the possibility that a returning light pulse may be detected during a subsequent detection period rather than the same detection period as the emitted light pulse. The background image can be used to resolve such range ambiguities.

Other image processing techniques (e.g., Fourier analysis, inpainting, etc.) may be used to determine range data from the background image.

In some embodiments, the background image may be used to identify one or more ranges in the range image as being unreliable (e.g., artifacts) and, potentially, to remove or correct such unreliable range data. Ranges in the range image may be unreliable for various reasons. In some cases, a retroreflector or other highly reflective object may be illuminated by one or more light pulses from the lidar device. The light intensity from the returning light pulses may be so high as to cause cross-talk, blooming, or other artifacts that appear in the range image as spurious or inaccurate range data. Other artifacts may be caused by contaminants on the aperture of the lidar device or by weather conditions (e.g., snow, rain, or fog).

In general, such artifacts may be identified based on range data in pixels in the range image that do not have corresponding object pixels in the background image. For example, the background image 600 shows that the sign is smaller than indicated by the range data in the range image 500 (the sign takes up four pixels in the range image 500 but takes up only one pixel in the background image 600). From this comparison, it is possible to infer that three of the four pixels in the range image 500 have ranges that are merely artifacts (e.g., cross-talk resulting from the sign's retrore-flective surface).

In one approach, a trained convolutional neural network (CNN) may be used to identify artifacts in the range image based on the background image. The CNN may perform a semantic analysis on the background image to identify objects (e.g., retroreflectors) that may cause cross-talk or other spurious range data in neighboring pixels. The corresponding pixels in the range image that may have such spurious ranges may be flagged or filtered out.

An enhanced range image may be generated based on the range image and the background image, using any of the techniques described above. Thus, the enhanced range image may include additional range data that is not included in the original range image, based on objects identified in the background image. Alternatively or additionally, one or more ranges included in the range image may not be included in the enhanced range image, based on analysis of the background image.

Figure 7:
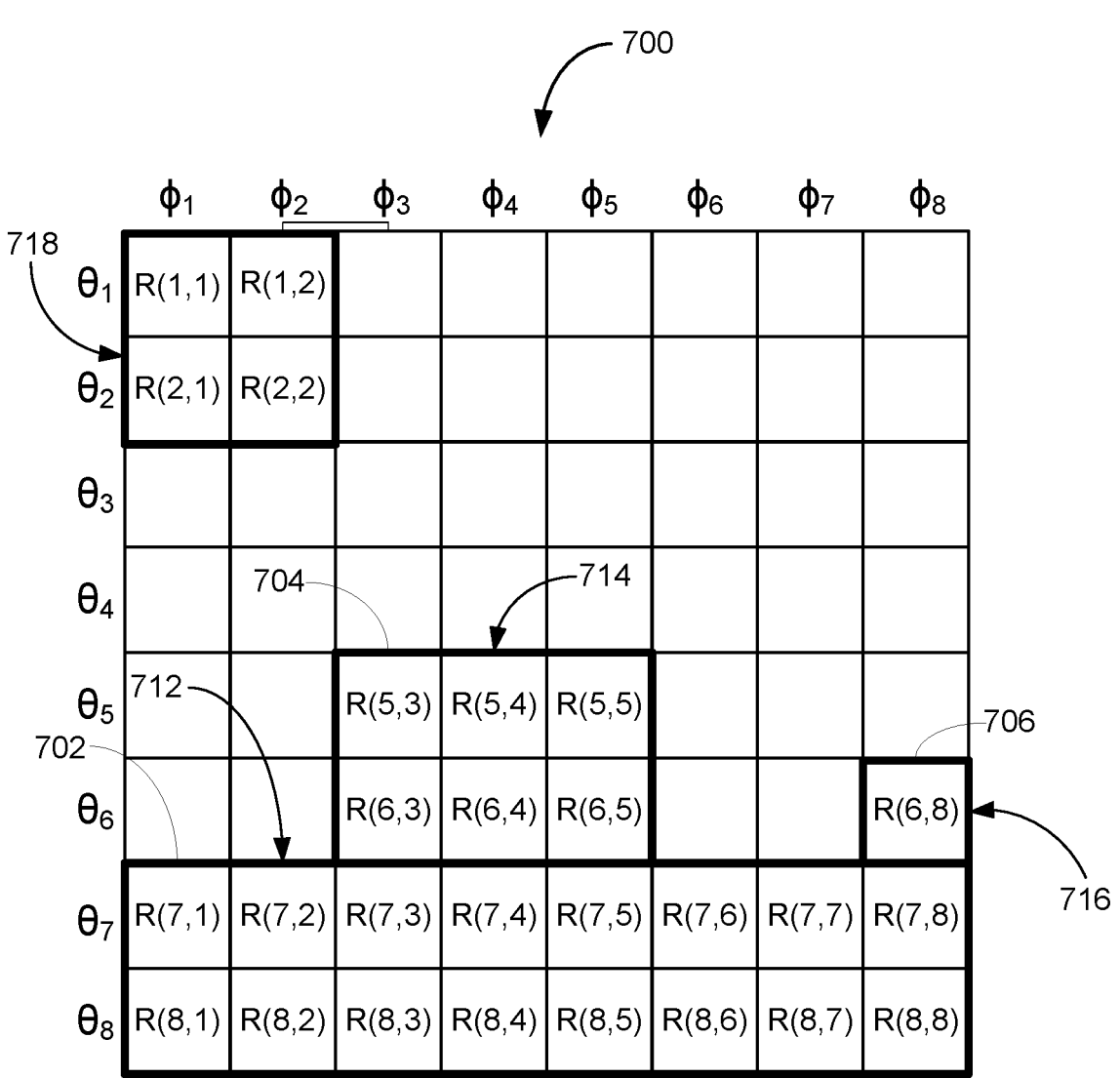
FIG. 7 illustrates an enhanced range image that is generated based on the range image illustrated in FIG. 5 and the background image illustrated in FIG. 6, according to an example embodiment.

FIG. 7 shows an enhanced range image 700 that may be generated based on the range image 500 and the background image 600. The range data included in the enhanced range image 700 is different than the range data included in the original range image 500. As indicated by the bounding box 718, enhanced range image 700 includes ranges for the building identified in the background image (indicated by bounding box 618), whereas the corresponding pixels in the range image 500 are blank. As indicated by the bounding box 716, enhanced range image 700 includes range data for the sign only in pixel 706 (corresponding to pixel 506 in range image 500 and pixel 606 in background image). Thus, the spurious range data in the neighboring pixels, resulting from cross-talk caused by the retroreflective surface of the sign, has been removed in the enhanced range image 700.

Figure 8:
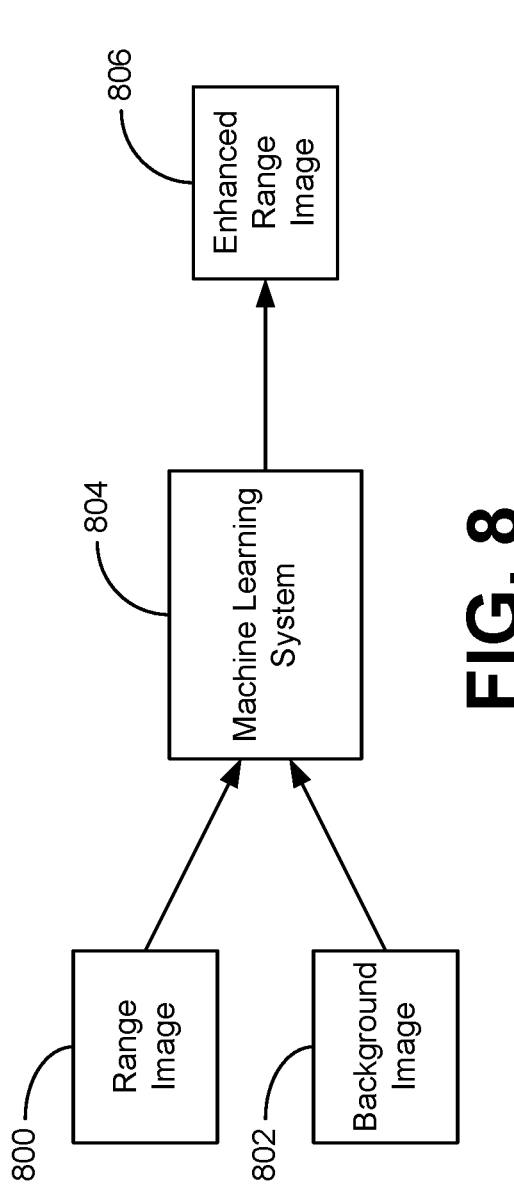
FIG. 8 is a block diagram illustrating a process of generating an enhanced range image based on a range image and a background, according to an example embodiment.

FIG. 8 is a functional block diagram that illustrates the basic approach of providing a range image 800 and a background image 802 to a machine learning system 804 that generates an enhanced range image 806 as output. The range data included in the enhanced range image 806 may be more comprehensive and/or more reliable than the range data included in the range image 800. The enhanced range image 806 may, in turn, be used to control a vehicle operating in an autonomous mode.

Figure 9:
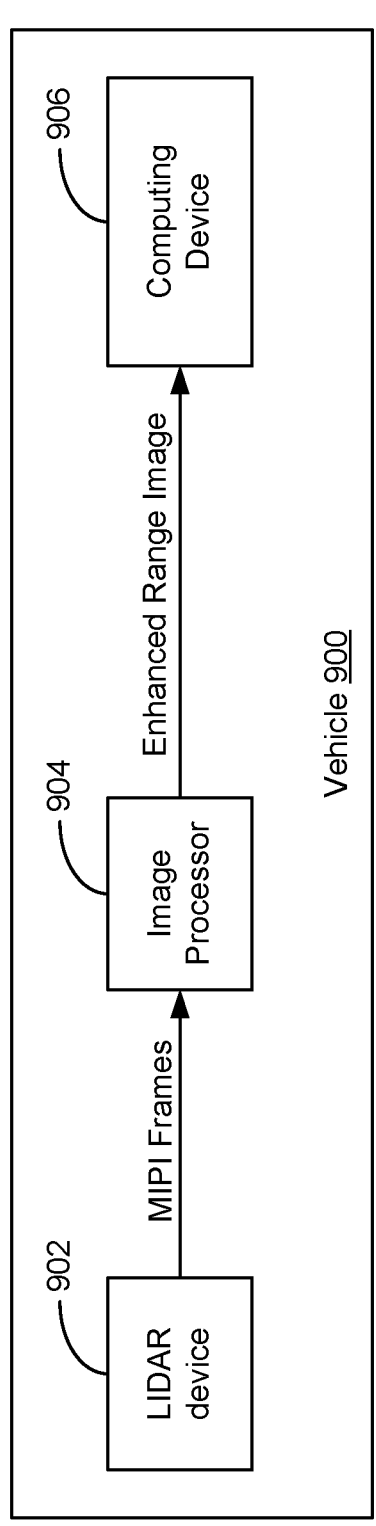
FIG. 9 is a block diagram of an example system in an autonomous vehicle, according to an example embodiment.

FIG. 9 illustrates an example vehicle 900 that includes a lidar device 902, an image processor 904, and a computing device 906. The lidar device 902 includes one or more light emitters and one or more light detectors. The lidar device 902 is configured to scan a surrounding environment around the vehicle 900. The lidar device 902 generates a range image and a background image based on the scan and transmits the images to the image processor 904.

In some implementations, the range image and background image may be transmitted using a standardized interface, such as an interface according to Mobile Industry Processor Interface (MIPI) specifications. Thus, the lidar device 902 may transmit the range image and the background image in MIPI frames, as shown in FIG. 9.

The image processor 904 could be, for example, a field-programmable gate array (FPGA), application specific integrated circuit (ASIC), or other type of processor configured to apply a trained machine learning system that generates an enhanced range image based on the range image and background image from the lidar device 902. The image processor 904 could transmit the enhanced range image to the computing device 906. The computing device 906 could be configured to control the vehicle 900 in an autonomous or semi-autonomous mode of operation (e.g., control a speed, acceleration, or direction of the vehicle 900) based on various sources of information, including the enhanced range image.

In addition to range images, other types of images could be generated based on returning light pulses, such as returning light pulse 416 shown in FIG. 4A. As one example, the intensity of each returning light pulse (e.g., intensity based on the height or maximum value of each returning light pulse) could be used to determine the reflectivities of one or more objects in the surrounding environment. The reflectivities could be in terms of equivalent Lambertian reflectivities. Thus, a reflectivity image could include data indicative of reflectivities of one or more objects in the surrounding environment. As another example, the number of photons in each returning light pulse could be counted and used to generate a returning photon image. Thus, a returning photon image could include data indicative of the number of returning photons detected for one or more objects in the surrounding environment. As yet another example, the elongation of each returning light pulse could be measured to generate a pulse elongation image. Thus, a pulse elongation image could include data indicative of the pulse elongations measured for one or more objects in the surrounding environment. Like range image 500, such other returning pulse based images could include individual data values (e.g., reflectivity, photon count, or pulse elongation) for different pitch and yaw angles. Further, the background image can be used to enhance such returning pulse based images to include data that is more comprehensive and/or more reliable than the data included in the original returning pulse based image.

FIG. 10 is a flowchart diagram of a method 1000, according to example embodiments. In some embodiments, the method 1000 may be performed by a lidar device (e.g., the first lidar unit 204 or the second lidar unit 206 shown and described with reference to FIGS. 2A-2E).

At block 1002, the method 1000 may include scanning, by a light detection and ranging (lidar) device, a surrounding environment of the lidar device. The lidar device may include one or more light emitters and one or more light detectors. The scanning may include (i) using the one or more light emitters to emit a plurality of emitted light pulses in a plurality of directions and (ii) using the one or more light detectors to detect, for each direction of the plurality of directions, a corresponding received light signal, to obtain a plurality of received light signals for the plurality of directions.

At block 1004, the method 1000 may include determining, for each respective direction of the plurality of directions, a corresponding background light intensity based on the received light signal corresponding to the respective direction, to obtain a plurality of background light intensities for the plurality of directions.

At block 1006, the method 1000 may include generating a background image of the surrounding environment based on the plurality of background light intensities.

At block 1008, the method 1000 may include identifying one or more returning light pulses in the plurality of received light signals. Each returning light pulse may be indicative of reflection of an emitted light pulse by an object in the surrounding environment.

At block 1010, the method 1000 may include generating a range image of the surrounding environment based on the one or more returning light pulses. The range image may include range data indicative of ranges of one or more objects in the surrounding environment.

In some embodiments, the method 1000 may also include generating an enhanced range image based on the background image and the range image (e.g., similar to the enhanced range image 700 illustrated in FIG. 7). The enhanced range image may be generated by a processor executing a trained machine learning system, for example. The enhanced range image may include additional range data that is not included in the base range image. Such additional range data may be based on objects identified in the background image, for example. Additionally or alternatively, one or more ranges included in the base range image may not be included in the enhanced range image, based on an analysis of the background image.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

Embodiments of the present disclosure may thus relate to one of the enumerated example embodiments (EEEs) listed below.

EEE 1 is a method, comprising:

scanning, by a light detection and ranging (lidar) device, an environment surrounding the lidar device, wherein the lidar device comprises one or more light emitters and one or more light detectors, and wherein the scanning comprises (i) using the one or more light emitters to emit a plurality of emitted light pulses in a plurality of directions and (ii) using the one or more light detectors to detect, for each direction of the plurality of directions, a corresponding received light signal, to obtain a plurality of received light signals for the plurality of directions;

determining, for each respective direction of the plurality of directions, a corresponding background light intensity based on the received light signal corresponding to the respective direction, to obtain a plurality of background light intensities for the plurality of directions;

generating a background image of the environment surrounding the lidar device based on the plurality of background light intensities;

identifying one or more returning light pulses in the plurality of received light signals, wherein each returning light pulse is indicative of reflection of an emitted light pulse by an object in the environment surrounding the lidar device; and generating a range image of the environment surrounding the lidar device based on the one or more returning light pulses, wherein the range image includes range data indicative of ranges of one or more objects in the environment surrounding the lidar device.

EEE 2 is the method of EEE 1, further comprising:

determining additional range data using the background image.

EEE 3 is the method of EEE 2, wherein determining additional range data using the background image comprises:

identifying an object in the background image; and determining a range to the object based on a size of the object in the background image.

EEE 4 is the method of EEE 2 or EEE 3, wherein the additional range data comprises data indicative of ranges of one or more objects that are not included in the range image.

EEE 5 is the method of any of EEEs 2-4, wherein the additional range data comprises data indicative of ranges of one or more objects that are more distant than the one or more objects included in the range image.

EEE 6 is the method of any of EEEs 1-5, further comprising:

generating an enhanced range image based on the background image and the range image, wherein the enhanced range image includes additional range data that was not included in the range image.

EEE 7 is the method of EEE 6, wherein generating the enhanced range image based on the background image and the range image comprises:

providing the background image and the range image as inputs to a trained machine learning system; and receiving the enhanced range image as an output of the trained machine learning system.

EEE 8 is the method of EEE 7, wherein the trained machine learning system comprises a generative adversarial network (GAN).

EEE 9 is the method of EEE 8, wherein the GAN is configured to apply a colorization that associates ranges with colors.

EEE 10 is the method of any of EEEs 1-9, further comprising:

using the background image to detect artifacts in the range image.

EEE 11 is the method of EEE 10, wherein using the background image to detect artifacts in the range image comprises:

performing a semantic analysis of the background image using a convolutional neural network, wherein the semantic analysis identifies one or more objects in the background image that are indicative of unreliable range data in the range image.

EEE 12 is the method of any of EEEs 1-11, further comprising:

using the background image to identify one or more ranges in the range image as being unreliable.

EEE 13 is the method of EEE 12, wherein using the background image to identify one or more ranges in the range image as being unreliable comprises:

identifying a retroreflector in the background image.

EEE 14 is the method of EEE 12 or EEE 13, further comprising:

adjusting the range data in the range image based on the background image.

EEE 15 is the method of any of EEEs 1-14, further comprising:

generating a reflectivity image of the environment surrounding the lidar device based on the one or more returning light pulses, wherein the reflectivity image includes reflectivity data indicative of reflectivities of the one or more objects in the environment surrounding the lidar device.

EEE 16 is the method of EEE 15, further comprising:

generating an enhanced reflectivity image based on the background image and the reflectivity image.

EEE 17 is the method of any of EEEs 1-16, further comprising:

generating a returning photon image based on the one or more returning light pulses, wherein the returning photon image includes returning photon data indicative of the number of returning photons detected for the one or more objects in the environment surrounding the lidar device.

EEE 18 is the method of EEE 17, further comprising:

generating an enhanced returning photon image based on the background image and the returning photon image.

EEE 19 is the method of any of EEEs 1-18, wherein the scanning comprises:

emitting, by a light emitter of the one or more light emitters, a first light pulse in a first direction at a first emission time;

detecting, by a light detector of the one or more light detectors, a first received light signal during a first detection period, wherein the light detector has a first field of view that corresponds to the first direction during the first detection period;

emitting, by the light emitter, a second light pulse in a second direction at a second emission time; and detecting, by the light detector, a second received light signal during a second detection period, wherein the light detector has a second field of view that corresponds to the second direction during the second detection period, wherein the first received light signal and the second received light signal are used to generate the background image and the range image.

EEE 20 is the method of any of EEEs 1-19, wherein the one or more light emitters include a first light emitter and a second light emitter and the one or more light detectors include a first light detector and a second light detector, wherein the scanning comprises:

during a first light-emission period, emitting, by the first light emitter, a first light pulse in a first direction and emitting, by the second light emitter, a second light pulse in a second direction;

during a first light-detection period, detecting, by the first light detector, a first received light signal and detecting, by the second light detector, a second received light signal, wherein the first light detector has a first field of view that corresponds to the first direction during the first light-detection period and the second light detector has a second field of view that corresponds to the second direction during the first light-detection period;

during a second light-emission period, emitting, by the first light emitter, a third light pulse in a third direction and emitting, by the second light emitter, a fourth light pulse in a fourth direction; and during a second light-detection period, detecting, by the first light detector, a third received light signal and detecting, by the second light detector, a fourth received light signal, wherein the first light detector has a third field of view that corresponds to the third direction during the second light-detection period and the second light detector has a fourth field of view that corresponds to the fourth direction during the second light-detection period, wherein the first received light signal, the second received light signal, the third received light signal, and the fourth received light signal are used to generate the background image and the range image.

EEE 21 is the method of any of EEEs 1-20, wherein each light detector of the one or more light detectors comprises an array of SPADs.

EEE 22 is a system, comprising:

a light detection and ranging (lidar) device, wherein the lidar device comprises one or more light emitters and one or more light detectors, and wherein the lidar device is configured to:

scan an environment surrounding the lidar device using the one or more light emitters to emit a plurality of emitted light pulses in a plurality of directions and using the one or more light detectors to detect, for each direction of the plurality of directions, a corresponding received light signal, to obtain a plurality of received light signals for the plurality of directions;

determine, for each respective direction of the plurality of directions, a corresponding background light intensity based on the received light signal corresponding to the respective direction, to obtain a plurality of background light intensities for the plurality of directions;

generate a background image of the environment surrounding the lidar device based on the plurality of background light intensities;

identify one or more returning light pulses in the plurality of received light signals, wherein each returning light pulse is indicative of reflection of an emitted light pulse by an object in the environment surrounding the lidar device; and generate a range image of the environment surrounding the lidar device based on the one or more returning light pulses, wherein the range image includes range data indicative of ranges of one or more objects in the environment surrounding the lidar device; and an image processor coupled to the lidar device, wherein the image processor is configured to (i) receive the background image and the range image from the lidar device and (ii) generate an enhanced range image based on the background image and the range image, wherein the enhanced range image includes additional range data that was not included in the range image.

EEE 23 is the system of EEE 22, wherein the image processor is configured to generate the enhanced range image using a trained machine learning system.

EEE 24 is the system of EEE 22 or EEE 23, wherein the lidar device is coupled to a vehicle, wherein the image processor is configured to transmit the enhanced range image to a computing device, wherein the computing device is configured to control the vehicle in an autonomous mode.

EEE 25 is a digital image, comprising:

range data determined based on detection by a light detection and ranging (lidar) device of light having wavelengths of approximately a specific wavelength, wherein the light is from one or more objects in an environment surrounding the lidar device reflecting one or more laser light pulses emitted by the lidar device in a plurality of different directions; and background image data determined based on detection by the lidar device of a respective background light intensity for each of the plurality of different directions.

EEE 26 is the digital image of EEE 25, wherein the background light intensities are indicative of ambient light intensities in the environment surrounding the lidar device.

EEE 27 is the digital image of EEE 25 or EEE 26, wherein the lidar device detects a background light intensity for each given direction prior to emitting a laser light pulse in the given direction.

EEE 28 is the digital image of any of EEEs 25-27, wherein the lidar device detects a background light intensity for each given direction after emitting a laser light pulse in the given direction.

EEE 29 is the digital image of any of EEEs 25-28, wherein the background image data comprises data indicative of light received by the lidar device beyond an unambiguous range of the lidar device.

EEE 30 is a method, comprising:

obtaining range data that is determined based on detection by a light detection and ranging (lidar) device of light having wavelengths of approximately a specific wavelength, wherein the light is from one or more objects in an environment surrounding the lidar device reflecting one or more laser light pulses emitted by the lidar device in a plurality of different directions;

obtaining background image data that is determined based on detection by the lidar device of a respective background light intensity for each of the plurality of different directions; and generating a digital image based on the range data and the background image data.

EEE 31 is the method of EEE 30, further comprising:

generating additional range data based on the background image data, wherein the digital image includes the additional range data.

EEE 32 is the method of EEE 30 or EEE 31, further comprising:

correcting the range data based on the background image data, wherein the digital image includes the corrected range data.

EEE 33 is the method of any of EEEs 30-32, further comprising:

determining a quality of the range data based on the background image data, wherein the digital image includes an indication of the quality of the range data.

What is claimed is:

1. A method, comprising:

scanning, by a light detection and ranging (lidar) device, an environment surrounding the lidar device, wherein the lidar device comprises one or more light emitters and one or more light detectors, and wherein the scanning comprises (i) using the one or more light emitters to emit a plurality of emitted light pulses in a plurality of directions and (ii) using the one or more light detectors to detect, for each direction of the plurality of directions, a corresponding received light signal, to obtain a plurality of received light signals for the plurality of directions;

determining, for each respective direction of the plurality of directions, a corresponding background light intensity based on the received light signal corresponding to the respective direction, to obtain a plurality of background light intensities for the plurality of directions;

generating a background image of the environment surrounding the lidar device, wherein the background image comprises the background light intensities for each of the plurality of directions;

identifying one or more returning light pulses in the plurality of received light signals, wherein each returning light pulse is indicative of reflection of an emitted light pulse by an object in the environment surrounding the lidar device;

generating a range image of the environment surrounding the lidar device based on the one or more returning light pulses, wherein the range image includes range data indicative of ranges of one or more objects in the environment surrounding the lidar device, and wherein the range image does not include range data for at least one of the plurality of directions; and determining additional range data using the background image, wherein the additional range data comprises data indicative of ranges of one or more objects that are not included in the range image and ranges that are greater than a maximum range of the lidar device.

2. The method of claim 1, wherein the range image does not include range data for at least one pitch angle.

3. The method of claim 1, wherein determining additional range data using the background image comprises:

identifying an object in the background image; and determining a range to the object based on a size of the object in the background image.

4. The method of claim 1, wherein the range image does not include range data for at least one yaw angle.

5. The method of claim 1, wherein the additional range data comprises data indicative of ranges of one or more objects that are more distant than the one or more objects included in the range image.

6. The method of claim 1, further comprising:

generating an enhanced range image based on the background image and the range image, wherein the enhanced range image includes additional range data that was not included in the range image.

7. The method of claim 6, wherein generating the enhanced range image based on the background image and the range image comprises:

providing the background image and the range image as inputs to a trained machine learning system; and receiving the enhanced range image as an output of the trained machine learning system.

8. The method of claim 7, wherein the trained machine learning system comprises a generative adversarial network (GAN).

9. The method of claim 8, wherein the GAN is configured to apply a colorization that associates ranges with colors.

10. The method of claim 1, further comprising:

using the background image to detect artifacts in the range image.

11. The method of claim 10, wherein using the background image to detect artifacts in the range image comprises:

performing a semantic analysis of the background image using a convolutional neural network, wherein the semantic analysis identifies one or more objects in the background image that are indicative of unreliable range data in the range image.

12. The method of claim 1, further comprising:

using the background image to identify one or more ranges in the range image as being unreliable.

13. The method of claim 12, wherein using the background image to identify one or more ranges in the range image as being unreliable comprises:

identifying a retroreflector in the background image.

14. The method of claim 12, further comprising:

adjusting the range data in the range image based on the background image.

15. The method of claim 1, further comprising:

generating a reflectivity image of the environment surrounding the lidar device based on the one or more returning light pulses, wherein the reflectivity image includes reflectivity data indicative of reflectivities of the one or more objects in the environment surrounding the lidar device.

16. The method of claim 15, further comprising:

generating an enhanced reflectivity image based on the background image and the reflectivity image.

17. The method of claim 1, further comprising:

generating a returning photon image based on the one or more returning light pulses, wherein the returning photon image includes returning photon data indicative of the number of returning photons detected for the one or more objects in the environment surrounding the lidar device.

18. The method of claim 17, further comprising:

generating an enhanced returning photon image based on the background image and the returning photon image.

\* \* \* \* \*